Patented Apr. 10, 1923.

1,450,990

UNITED STATES PATENT OFFICE.

EDMUND C. SHOREY, OF WASHINGTON, DISTRICT OF COLUMBIA.

PROCESS OF MAKING 2-NAPHTHOL 3-CARBOXYLIC ACID.

No Drawing. Application filed March 14, 1922. Serial No. 543,775.

*To all whom it may concern:*

Be it known that I, EDMUND C. SHOREY, a citizen of the United States, residing at Washington, D. C., have invented certain new and useful Improvements in Process of Making 2-Naphthol 3-Carboxylic Acid, of which the following is a specification.

The process heretofore employed for making 2-naphthol 3-carboxylic acid comprises heating a dry beta naphtholate, usually sodium beta naphtholate in an atmosphere of carbon dioxide under pressure. This process is based upon the disclosure in U. S. Patent to Schmitt No. 410,295.

In working upon the process with the object of improving the yield of 2-naphthol 3-carboxylic acid I have proceeded upon the theory that the formation of beta naphthol and its presence in the reaction mixture are the principal causes of relatively poor yields heretofore obtained. The beta naphthol formed not only correspondingly reduces the amount of beta naphtholate available for conversion into 2-naphthol 3-carboxylic acid but also, according to my theory, retards the conversion of the beta naphtholate into 2-naphthol 3-carboxylic acid or promotes undesired reactions, for instance, the formation of beta naphthol, or both.

The heating of the beta naphtholate under pressure of carbon dioxid is not merely heating under the pressure of a gas. The action of the carbon dioxid upon the beta naphtholate is essential. Beta naphthol present in the reaction mixture at the time of heating with carbon dioxid, which beta naphthol may have been formed in a preliminary stage of the process, during the heating with carbon dioxid, or both, interferes with the action of the carbon dioxid by enveloping the beta naphtholate and thus preventing contact between the carbon dioxid and the beta naphtholate and also by diluting the carbon dioxid. The beta naphthol present also enters into undesired reactions resulting in the formation of more beta naphthol and other undesired products.

My process comprises heating a metal beta naphtholate such as sodium beta naphtholate to a temperature at which it is converted into 2-naphthol 3-carboxylic acid in the presence of carbon dioxid under pressure and in removing beta naphthol from the reaction mixture preferably by continuously or from time to time suplying carbon dioxid free from beta naphthol to the reaction chamber and removing carbon dioxid mixed with beta naphthol gas or vapor from the reaction chamber.

My process, aside from the step of heating the beta naphtholate in the presence of carbon dioxid, is carried out in the usual known manner. The heating with carbon dioxid is preferably carried out at a maximum temperature of from 200 to 250° C. and under superatmospheric pressure. The pressure may vary. I have successfully employed pressures of from 5 to 200 pounds to the square inch although it is apparent that higher or lower pressures may be employed. High pressure is desirable since the absorption of carbon dioxid is more rapid at high pressures. A pressure of 50 pounds to the square inch has been found to be a suitable working pressure for factory operation. Carbon dioxid is preferably supplied to the autoclave continuously from a source of supply under pressure, for instance, a pump or a tank containing the carbon dioxid under pressure. For the purpose of withdrawing carbon dioxid carrying beta naphthol from the autoclave the latter may be provided with a release valve operated to maintain the desired pressure in the autoclave. The carbon dioxid with its beta naphthol content may of course be wasted but it is preferred to pass the gas through a condenser or absorber in which the beta naphthol is removed and recovered. The carbon dioxid is then returned to the autoclave and reused.

Various methods of circulating carbon dioxid through the autoclave for the purpose or removing beta naphthol are apparent. It is obviously preferable to so supply and remove the carbon dioxid that a current of carbon dioxid sweeps through or across the surface of the reaction mixture and thus removes the cloud or envelope of beta naphthol vapor or gas from the reaction mixture.

I claim:

1. In the process of making 2-naphthol 3-carboxylic acid by heating a metal beta naphtholate in an atmosphere of carbon dioxid under pressure, the step which consists in removing beta naphthol from the reaction mixture during the heating operation.

2. In the process of making 2-naphthol 3-carboxylic acid by heating alkali metal beta naphtholate in an atmosphere of carbon dioxid under pressure, the step which consists in carrying out the heating operation in a current of carbon dioxid.

3. In the process of making 2-naphthol 3-carboxylic acid by subjecting alkali metal beta naphtholate to the action of carbon dioxid under pressure and heating the reaction mixture, the step which consists in withdrawing gas carrying beta naphthol from said reaction mixture and supplying carbon dioxid gas free from beta naphthol to said reaction mixture during the heating operation.

4. In the process of making 2-naphthol 3-carboxylic acid by subjecting alkali metal beta naphtholate to the action of an atmosphere of carbon dioxid under pressure and heating the reaction mixture, the step which consists in withdrawing gas from said atmosphere, separating beta naphthol from the withdrawn gas, and returning the beta naphthol free gas to the said atmosphere.

5. Process of making 2-naphthol 3-carboxylic acid which comprises, charging an autoclave with alkali metal beta naphtholate and carbon dioxid under pressure, raising the temperature of the autoclave to from 200 to 250° C. and while maintaining said temperature circulating carbon dioxid free from beta naphthol through said retort.

In testimony whereof, I affix my signature.

EDMUND C. SHOREY.